(12) United States Patent
Wu

(10) Patent No.: US 6,591,830 B2
(45) Date of Patent: Jul. 15, 2003

(54) BARBEQUE GRILL ASSEMBLY WITH EASILY ASSEMBLED LEG UNITS

(75) Inventor: Tsan-Kuen Wu, Tainan Hsien (TW)

(73) Assignee: Tsan Kuen USA Inc., Pasadena, CA (US)

( * ) Notice: Subject to any disclaimer, the term of this patent is extended or adjusted under 35 U.S.C. 154(b) by 161 days.

(21) Appl. No.: 09/935,960

(22) Filed: Aug. 23, 2001

(65) Prior Publication Data

US 2003/0037781 A1 Feb. 27, 2003

(51) Int. Cl.⁷ ................................................. F24C 3/00
(52) U.S. Cl. ................................. 126/25 R; 126/304 A; 126/50
(58) Field of Search ........................... 126/25 R, 41 R, 126/276, 304 A, 50; 248/188.1, 188.8, 165

(56) References Cited

U.S. PATENT DOCUMENTS

| | | | | |
|---|---|---|---|---|
| 5,582,094 A | * | 12/1996 | Peterson et al. | 99/445 |
| 5,666,941 A | * | 9/1997 | Teufel et al. | 126/41 R |
| 5,934,203 A | * | 8/1999 | Glass | 108/156 |
| 5,979,431 A | * | 11/1999 | Hamilton et al. | 129/41 R |
| 6,412,480 B1 | * | 7/2002 | Harbin | 126/25 R |
| 6,474,327 B1 | * | 11/2002 | Bossler | 126/41 R |

* cited by examiner

Primary Examiner—Alfred Basichas
(74) Attorney, Agent, or Firm—Ladas & Parry

(57) ABSTRACT

A barbecue grill assembly includes a main frame mounted with a plurality of mounting seats, and a plurality of leg members with tubular upper end portions. Each of the mounting seats has a downwardly extending cylindrical coupling portion that is formed with a radial retaining pin. The upper end portion of each of the leg members is sleeved on the coupling portion of a respective mounting seat, and is formed with a retaining slot that includes a slide section extending downwardly from an upper edge of the leg member, and a locking section extending transversely from the slide section. The retaining pin is slidable along the slide section when the leg member is sleeved onto the respective mounting seat, and engages the locking section when the leg member is rotated subsequently and axially about the respective mounting seat, thereby retaining the leg member on the respective mounting seat.

10 Claims, 8 Drawing Sheets

BARBEQUE GRILL ASSEMBLY WITH EASILY ASSEMBLED LEG UNITS

BACKGROUND OF THE INVENTION

1. Field of the Invention

The present invention relates to a barbecue grill assembly, more particularly to a barbecue grill assembly which can be packed into a small package volume before assembly and which can be easily assembled.

2. Description of the Related Art

FIG. 1 illustrates a conventional barbecue grill assembly 1 which includes a leg unit 11 and a cooking unit 12 supported on the leg unit 11. The leg unit 11 includes four leg members 111, each of which includes an upright lower section 115 and a horizontal upper section 117 extending integrally from the lower section 115 to form a side rack. As shown, the leg members 111 are fixed in size and shape, and are relatively long in length. Therefore, a relatively large package volume is required when the barbecue grill assembly 1 is packed for transport from a manufacturer to a retailer or a consumer.

SUMMARY OF THE INVENTION

Therefore, the main object of the present invention is to provide a barbecue grill assembly which can be packed into a small package volume before assembly and which can be easily assembled.

Accordingly, the barbecue grill assembly of the present invention includes a main frame, a plurality of mounting seats, and a plurality of leg members. The main frame is formed with a plurality of horizontal mounting plates. The mounting seats are disposed below and are secured to the mounting plates, respectively. Each mounting seat has a cylindrical coupling portion which extends downwardly and which has an outer wall surface formed with a radial retaining pin. The leg members are disposed respectively below the mounting seats. Each leg member has an upper end portion which is defined by a tubular wall that confines an axial top opening and which has an upper edge around the top opening. The upper end portion of each leg member has a retaining slot formed through the tubular wall. The retaining slot includes a slide section which extends downwardly from the upper edge of the tubular wall and which has a lower end, and a locking section which extends transversely from the lower end of the slide section. The upper end portion of each leg member is sleeved on the cylindrical coupling portion of a respective one of the mounting seats to enable extension of the retaining pin into the retaining slot of the respective one of the leg members. The retaining pin is slidable along the slide section of the retaining slot. Each leg member is axially rotatable relative to the cylindrical coupling portion of the respective one of the mounting seats so as to enable the retaining pin to move into the locking section of the retaining slot and engage the locking section when the retaining pin moves to the lower end of the slide section, thereby preventing removal of the leg members from the mounting seats in axial directions and thereby retaining the leg members on the mounting seats, respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
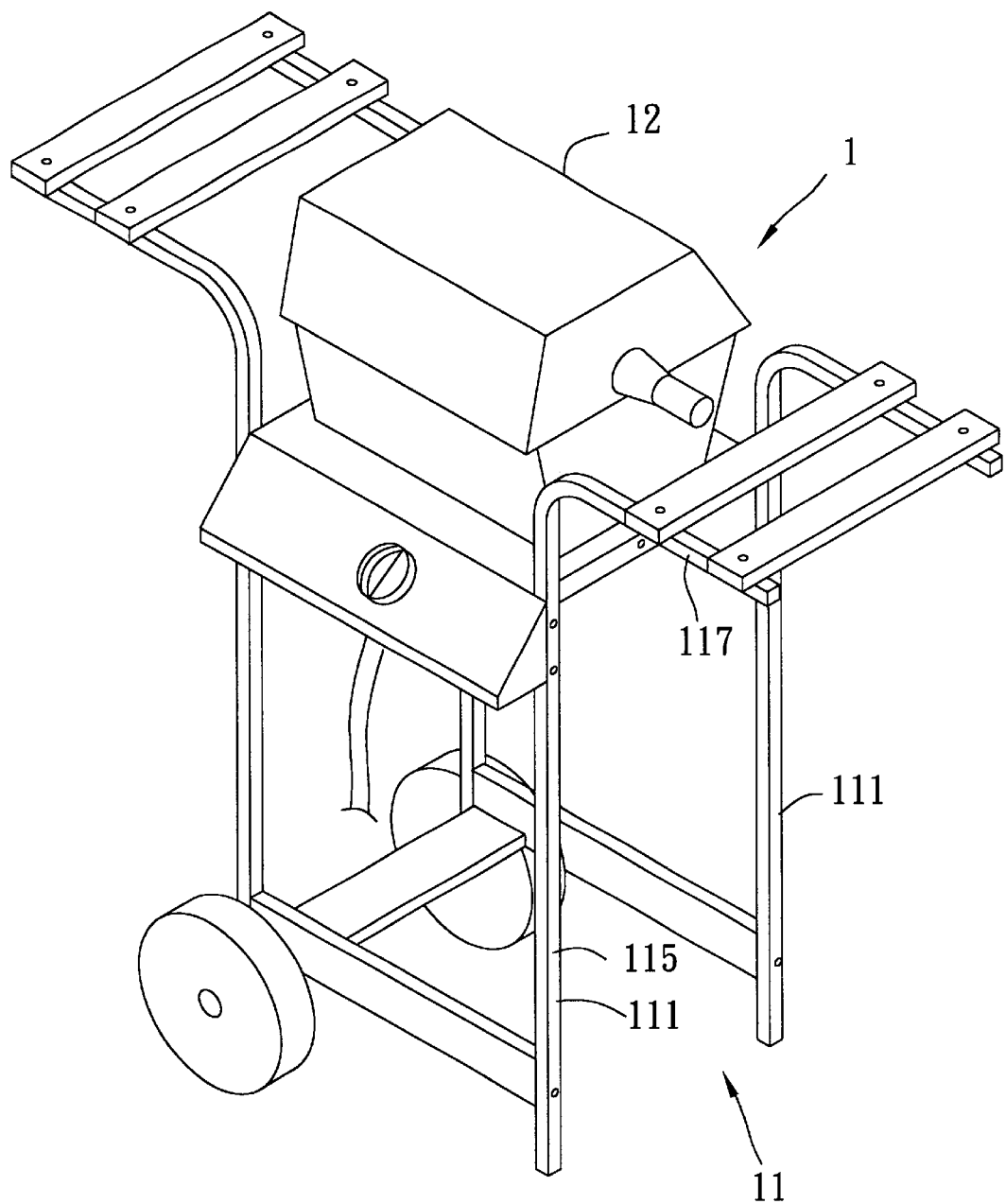
FIG. 1 is a perspective view of a conventional barbecue grill assembly.
Figure 2:
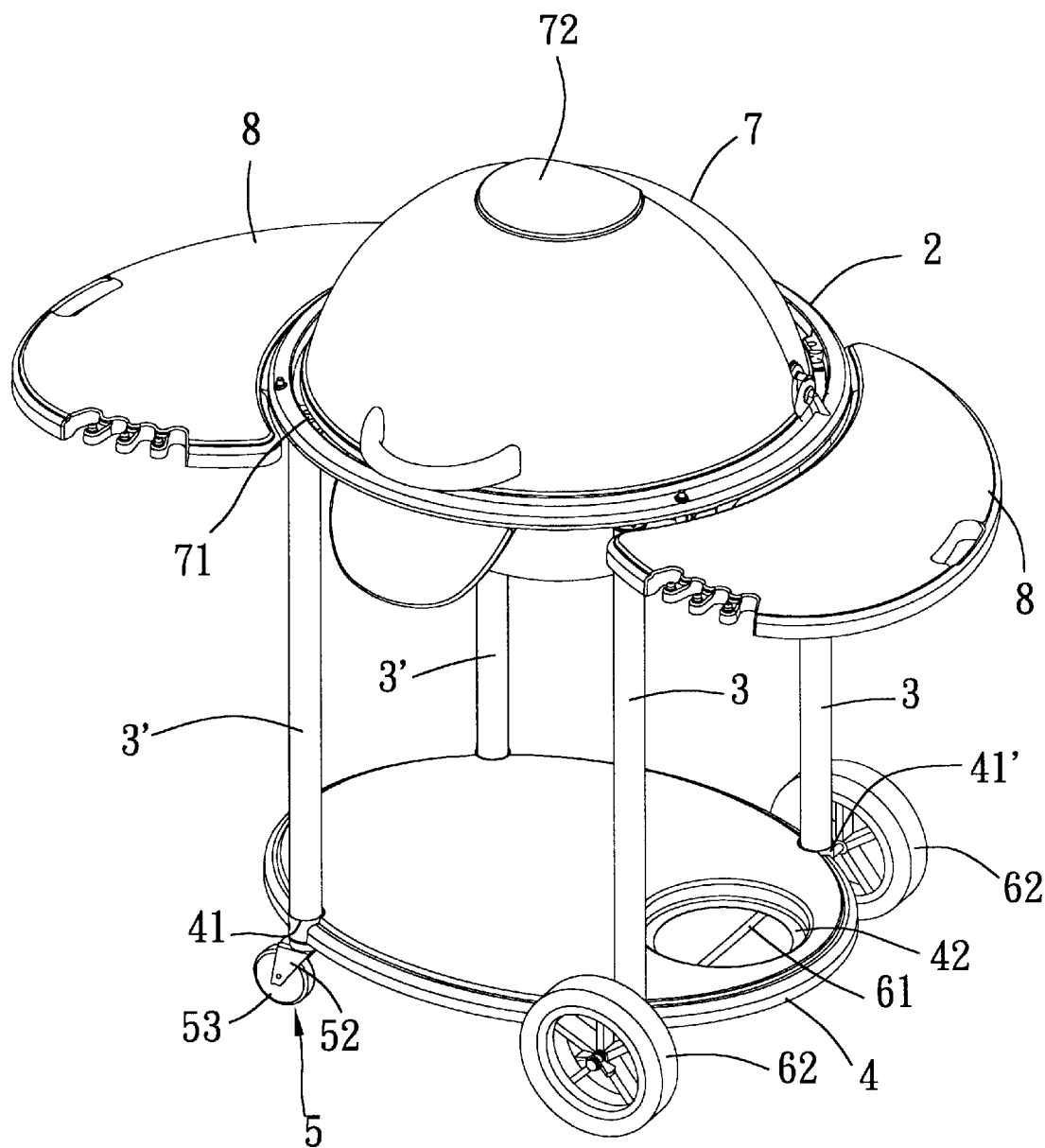
FIG. 2 is a perspective view of a preferred embodiment of the barbecue grill assembly of the present invention.
Figure 3:
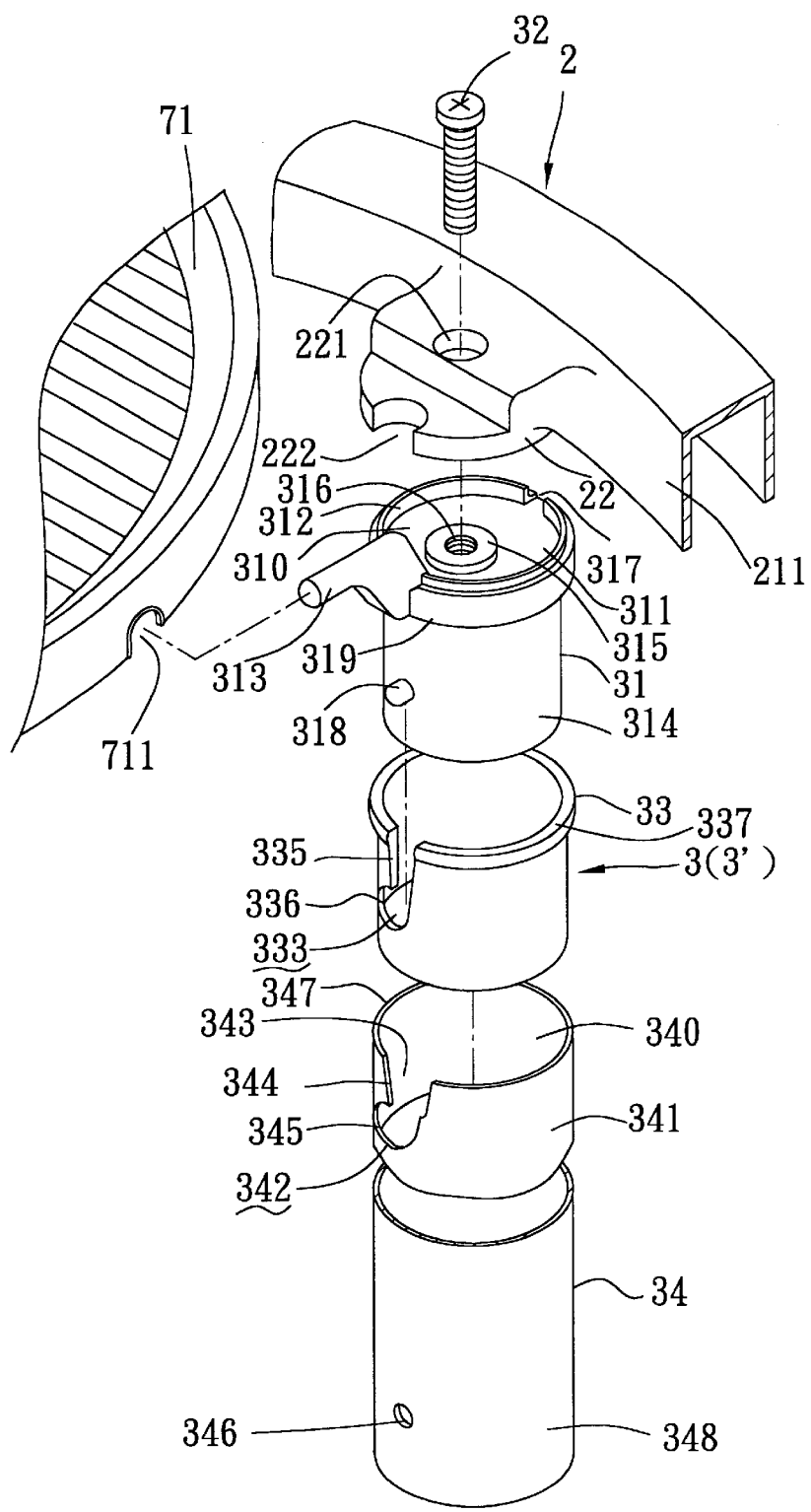
FIG. 3 is a fragmentary exploded perspective view of the preferred embodiment.

Referring to FIGS. 2 and 3, the preferred embodiment of the barbecue grill assembly according to the present invention is shown to include a horizontal main frame 2, a grill member 71, a pair of side racks 8 mounted on opposite sides of the main frame 2, a plurality of leg units 3, 3', a horizontal bottom plate 4, a pair of first wheel units 62, and a pair of second wheel units 5.

Figure 4:
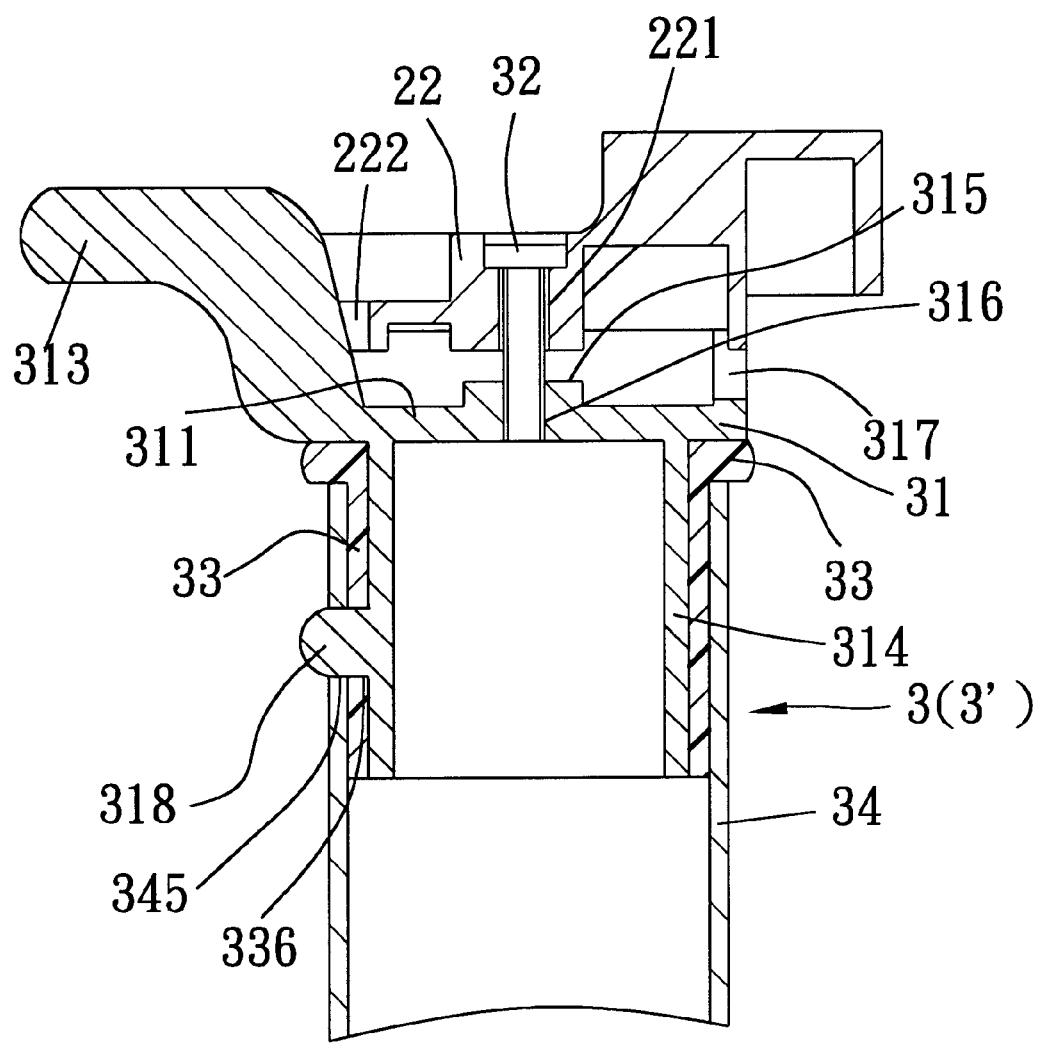
FIG. 4 is a fragmentary sectional view of the preferred embodiment, with a grill member removed therefrom.

Referring to FIGS. 3 and 4, the main frame 2 is formed from an annular metal strip, and has an annular inner peripheral wall 211 confronting a central axis of the main frame 2, and a plurality of horizontal mounting plates 22 projecting radially and inwardly from the inner peripheral wall 211. Each of the mounting plates 22 is formed with a fastener hole 221 that extends vertically therethrough, and has a radial inner edge opposite to the inner peripheral wall 211 of the main frame 2 and formed with a semi-circular slot 222.

Each of the leg units 3, 3' includes a plurality of mounting seats 31 disposed respectively below the mounting plates 22, a plurality of leg members 34 sleeved on the mounting seats 31, and a plurality of bushings 33 disposed between the mounting seats 31 and the leg members 34. Each of the mounting seats 31 includes a top wall 311 formed with a threaded hole 316 that is aligned with the fastener hole 221 in a respective one of the mounting plates 22, an annular rim 312 extending upwardly from a periphery of the top wall 311, and a cylindrical coupling portion 314 extending downwardly from the periphery of the top wall 311. The top wall 311 is fastened to the respective one of the mounting plates 22 by means of a respective threaded rod 32. The coupling portion 314 is formed as a hollow tube in the present embodiment, and extends integrally and downwardly from the top wall 311. The coupling portion 314 has an outer wall surface formed with a radial retaining pin 318. An annular shoulder 319 is formed around the top wall 311 and projects outwardly relative to the coupling portion 314 to define an upper end of the coupling portion 314. A support rod 313 extends upwardly from the mounting seat 31 and through the slot 222 in the respective mounting plate 22. The support rod 313 has a horizontal section extending toward an interior of the main frame 2 and disposed below the grill member 71 to support the grill member 71 thereon such that the grill member 71 is disposed above the mounting plates 22 and is surrounded by the inner peripheral wall 211. The grill member 71 has a surrounding wall with a bottom edge formed with four notches 711 for receiving the support rods 313 of the mounting seats 31. The top wall 311 cooperates with the annular rim 312 to confine a reservoir chamber 310 that opens upwardly and that is communicated with the slot 222 in the respective one of the mounting plates 22. The reservoir chamber 310 is adapted for receiving fluid, such as oil, that splashes onto the respective one of the mounting plates 22 when cooking food on the grill member 71. The top wall 311 is formed with an annular projection 315 around the threaded hole 316 to prevent fluid flowing into the threaded hole 316. The annular rim 312 is formed with a notch 317 for draining the fluid.

The bushing 33 is formed from a resilient material, such as rubber or plastic, and is defined by an annular wall. The bushing 33 has an upper edge formed with an annular flange 337, and a radial slot 333 formed through the annular wall and extending from the upper edge. The radial slot 333 has a straight slot section 335 extending downwardly and axially from the upper edge of the bushing 33, and a transverse slot section 336 extending transversely from a lower end of the straight slot section 335. The bushing 33 is sleeved on the coupling portion 314 of the mounting seat 31. The retaining pin 318 on the coupling portion 314 extends out of the bushing 33 via the radial slot 333. The retaining pin 318 extends into the straight slot section 335 of the radial slot 333 in the bushing 33 when the bushing 33 is sleeved onto the coupling portion 314 of the mounting seat 31 in an upward direction. After the retaining pin 318 reaches the lower end of the straight slot section 335, the bushing 33 is rotated axially by a small angle to enable the retaining pin 318 to extend into the transverse slot section 336 and engage the same so as to retain the bushing 33 on the mounting seat 31. The annular flange 337 abuts against the annular shoulder 319 on the mounting seat 31.

The leg member 34 is formed from a metal tube, and has an upper end portion 341 that confines an axial top opening 340 for receiving the coupling portion 314 of the mounting seat 31 and the bushing 33. The upper end portion 341 of the leg member 34 has an upper edge 347 extending around the top opening 340, and a retaining slot 342 formed through a tubular wall that defines the upper end portion 341. The retaining slot 342 includes a slide section 344 extending downwardly and axially from the upper edge 347, and a locking slot 345 extending transversely from a lower end of the slide section 344. A lower end portion 348 of the leg member 34 is formed with a diametrically extending axle hole 346. In the present embodiment, a first adjacent pair of the leg units 3 are longer than a second adjacent pair of the leg units 3' (see FIG. 2).

Referring back to FIG. 2, the bottom plate 4 is mounted among lower end portions of the leg units 3, 3'. The bottom plate 4 has a top side formed with a recessed portion 42 adapted for retaining a fuel tank (not shown) therein, and has a peripheral edge portion formed with four vertically extending mounting sleeves 41, 41', each of which is sleeved on the lower end portion 348 of the leg member 34 (see FIG. 3) of a respective one of the leg units 3, 3'. Due to the difference in the lengths of the leg units 3, 3', the axle holes 346 in the second adjacent pair of the leg units 3' are located within their corresponding mounting sleeves 41, while the axle holes 346 in the first adjacent pair of the leg units 3 are located below their corresponding mounting sleeves 41' and below the bottom plate 4.

Figure 5:
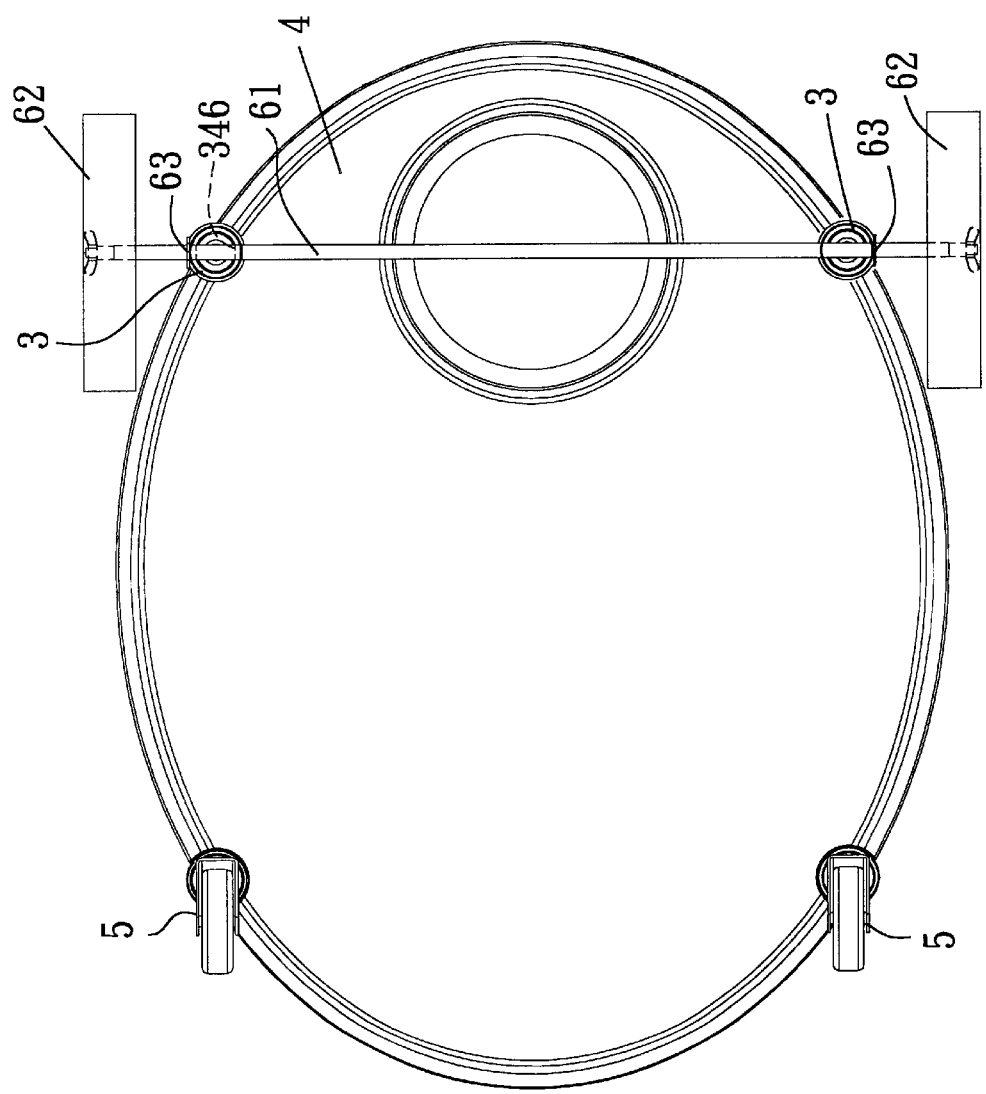
FIG. 5 is a bottom view of the preferred embodiment, where a pair of side racks are omitted for the sake of clarity.

Referring to FIGS. 2 and 5, a wheel axle 61 is disposed below the bottom plate 4, and extends through the axle holes 346 in the first adjacent pair of the leg units 3. The first wheel units 62 are mounted on two opposite ends of the wheel axle 61 so as to be rotatable about an axis of the wheel axle 61. The wheel axle 61 is provided with a pair of limiting members 63 on two opposite sides of the leg units 3 and between the wheel units 62 to prevent movement of the wheel axle 61 in a direction along the axis of the axle holes 346.

Figure 6:
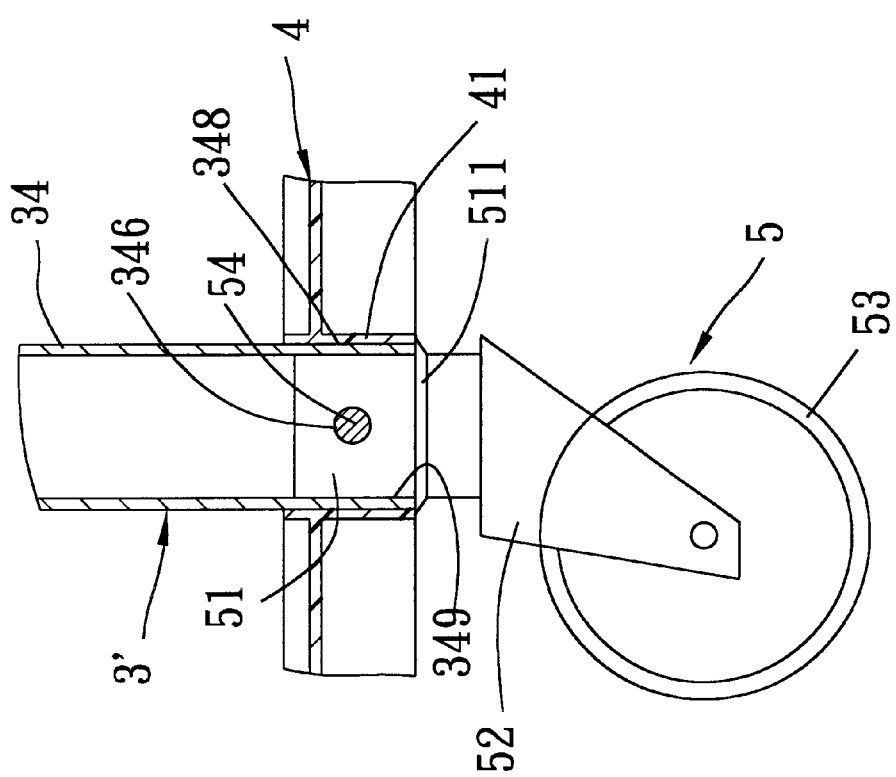
FIG. 6 is a fragmentary sectional view illustrating a wheel unit of the preferred embodiment.

Referring to FIGS. 2 and 6, each of the second wheel units 5 is mounted on the lower end portion 348 of the leg member 34 of a respective one of the second adjacent pair of the leg units 3'. Each of the second wheel units 5 includes an upright mounting post 51 extending upwardly into the lower end portion 348 of the leg member 34 via an axial bottom opening 349 of the leg member 34, a pivot seat 52 mounted pivotally on a lower end of the post 51 so as to be pivotable about a vertical axis, and a wheel member 53 carried by the pivot seat 52 and mounted on the pivot seat 52 so as to be rotatable about a horizontal rotary axis. The post 51 has an annular flange 511 formed on an outer surface thereof and abutting against a lower edge of the leg member 34. A fastening rod 54 extends horizontally through the post 51, the axle hole 346 of the leg member 34, and the mounting sleeve 41 of the bottom plate 4 for fastening together the post 51, the leg member 34, and the bottom plate 4. The wheel member 53 is thus rotatable in all directions along a ground surface.

Figure 7:
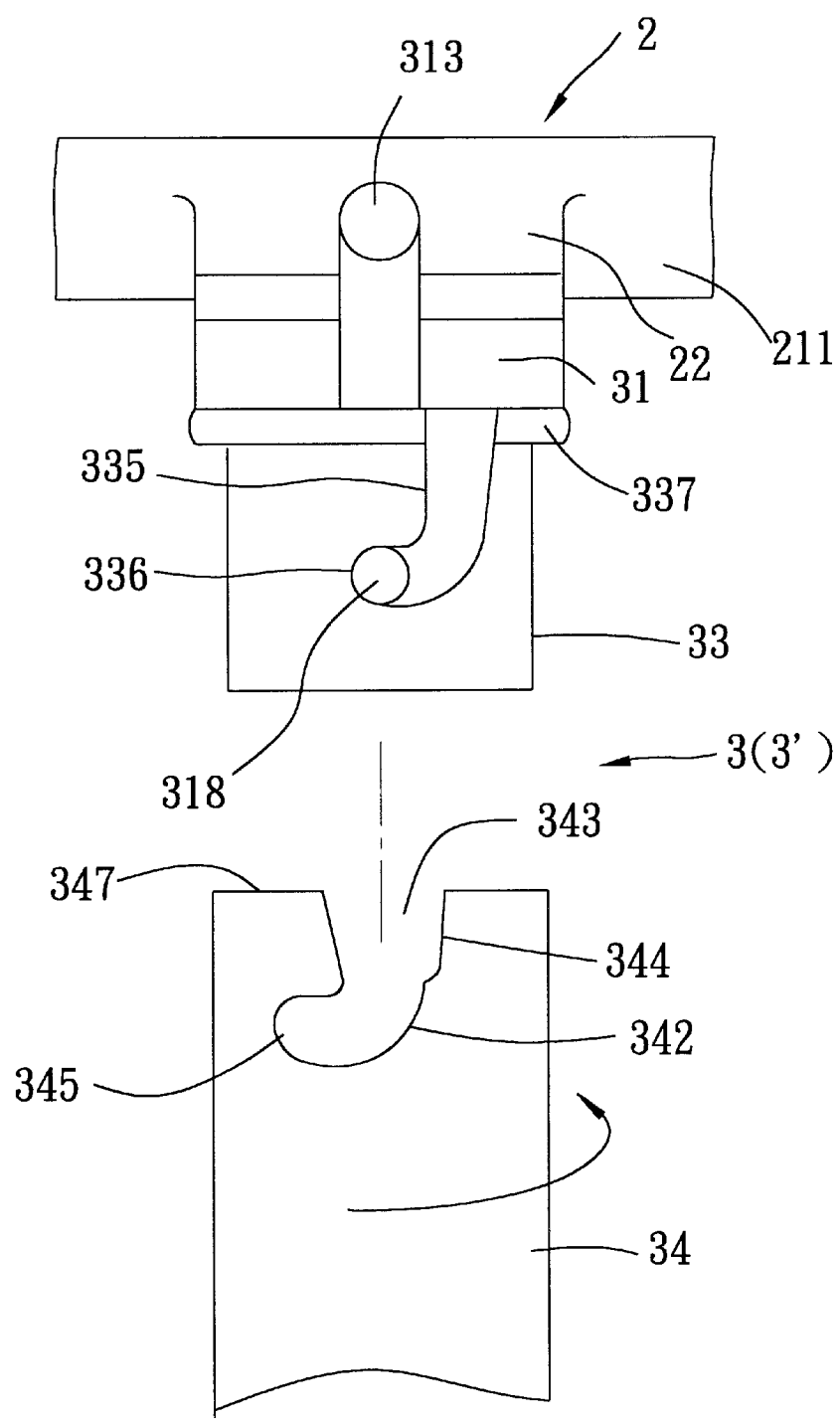
FIG. 7 is a fragmentary side view of the preferred embodiment, illustrating how a leg unit is assembled to a main frame.
Figure 8:
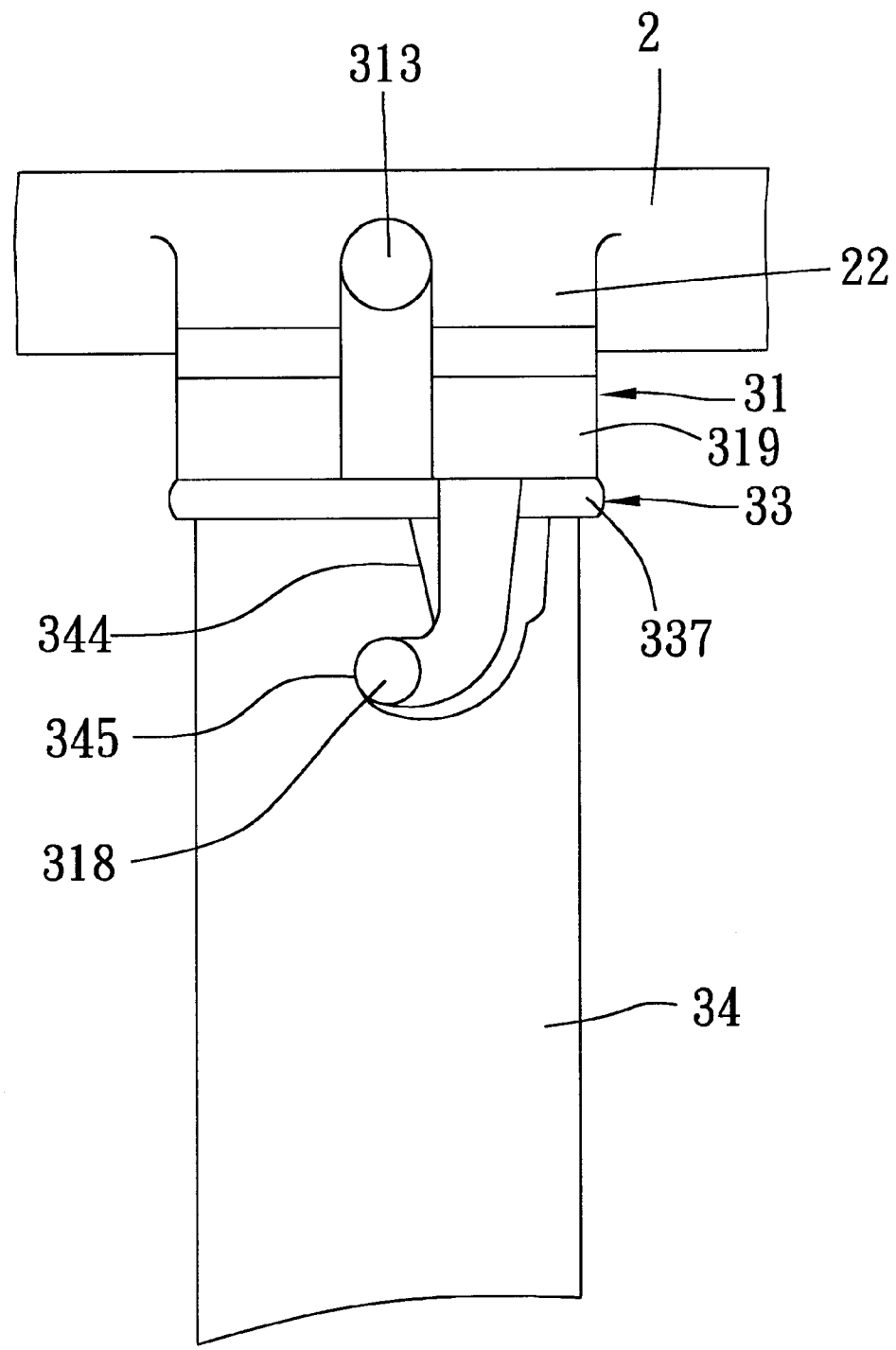
FIG. 8 is a fragmentary side view of the preferred embodiment, illustrating the leg unit and the main frame in an assembled state.

Referring to FIGS. 3, 7 and 8, during assembly, the mounting seats 31 are fastened respectively to the mounting plates 22 using the threaded rods 32. The bushings 33 are sleeved on the coupling portions 314 of the mounting seats 31, allowing the retaining pins 318 to extend into the straight slot sections 335 of the radial slots 333 in the bushings 33, and are then rotated for engaging the retaining pins 318 with the transverse slot sections 336 of the radial slots 333 so as to retain the bushings 33 on the mounting seats 31. Thereafter, the leg members 34 are sleeved respectively on the mounting seats 31 to dispose the bushings 33 between the leg members 34 and the mounting seats 31. During assembly of the leg members 34 to the mounting seats 31, each of the leg members 34 is disposed below a respective one of the mounting seats 31 to align the slide section 344 of the retaining slot 342 in the leg member 34 with the retaining pin 318 that projects through the bushing 33, and is then moved upwardly so as to be sleeved on the respective one of the mounting seats 31. The retaining pin 318 moves into the slide section 344 and slides to the lower end of the slide section 344. The leg member 34 is then rotated axially to enable the retaining pin 318 to extend into and engage the locking section 345 of the retaining slot 342, thereby preventing removal of the leg member 34 from the respective mounting seat 31 in an axial direction and thereby retaining the leg member 34 on the respective mounting seat 31. The annular flanges 337 of the bushings 33 are clamped between the upper edges 347 of the leg members 34 and the annular shoulders 319 of the mounting seats 31 to enhance coupling connection between the leg members 34 and the mounting seats 31. Thereafter, referring to FIGS. 2 and 5, the bottom plate 4 is assembled to the leg units 3, 3' by extending the leg members 34 through the mounting sleeves 41, 41' of the bottom plate 4. The wheel axle 61 extends through the axle holes 346 in the first adjacent pair of the leg units 3. The limiting members 63 and the first wheel units 62 are then assembled to the wheel axle 61. Referring to FIGS. 2 and 6, the second wheel units 5 are assembled to lower ends of the second adjacent pair of the leg units 3' by extending the upright mounting posts 51 into the lower end portions 348 of the leg members 34 and by fastening together the posts 51, the leg members 34 and the mounting sleeves 41 on the bottom plate 4 using the fastening rods 54. Since the first adjacent pair of the leg units 3 are retained by the wheel axle 61, and since the second adjacent pair of the leg units 3' are fastened to the bottom plate 4, axial rotation of the leg members 34 of the leg units 3, 3' is prevented after assembly. As such, engagement of the retaining pins 318 with the locking sections 345 of the retaining slots 342 can be ensured. Finally, the side racks 8 are assembled to the main frame 2, and the grill member 71 is disposed on the support rods 313. Since the present invention is not characterized by the construction of the side racks 8, a detailed description of the structural connection and the assembly operation between the side racks 8 and the main frame 2 is omitted herein for the sake of brevity.

Referring to FIGS. 3 and 7, it is noted that, in the present embodiment, the entrance 343 of the slide section 344 of the retaining slot 342 in each of the leg members 34 is wider than the cross-section of the retaining pin 318 on the respective mounting seat 31 to facilitate upward sleeving operation of the leg members 34 onto the mounting seats 31.

After manufacture, the components of the barbecue grill assembly are packed and are transported to a retailer or a consumer. Since the components are packed before assembly, the package volume requirement is relatively small, and thus facilitates transport of the same. Alternatively, the mounting seats 31 may be initially fastened to the mounting plates 22 and have the bushings 33 sleeved thereon before packing without significantly increasing the package volume requirement. Assembly of the leg members 34 to the mounting seats 31, and assembly of the bottom plate 4 and the wheel units 5, 62 to the leg members 34 can be easily accomplished by the consumer or the retailer.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A barbecue grill assembly comprising:

a main frame formed with a plurality of horizontal mounting plates;

a plurality of mounting seats disposed below and secured to said mounting plates, respectively, each of said mounting seats having a cylindrical coupling portion which extends downwardly and which has an outer wall surface formed with a radial retaining pin; and a plurality of leg members disposed respectively below said mounting seats, each of said leg members having an upper end portion which is defined by a tubular wall that confines an axial top opening and which has an upper edge around said top opening, said upper end portion of each of said leg members having a retaining slot formed through said tubular wall, said retaining slot including a slide section which extends downwardly from said upper edge of said tubular wall and which has a lower end, and a locking section which extends transversely from said lower end of said slide section, said upper end portion of each of said leg members being sleeved on said cylindrical coupling portion of a respective one of said mounting seats to enable extension of said retaining pin into said retaining slot of the respective one of said leg members, said retaining pin being slidable along said slide section of said retaining slot, each of said leg members being rotatable axially relative to said cylindrical coupling portion of the respective one of said mounting seats so as to enable said retaining pin to move into said locking section of said retaining slot and engage said locking section when said retaining pin moves to said lower end of said slide section, thereby preventing removal of said leg members from said mounting seats in axial directions and thereby retaining said leg members on said mounting seats, respectively.

2. The barbecue grill assembly as claimed in claim 1, wherein said main frame is annular in shape, and has an inner peripheral wall, said mounting plates projecting radially and inwardly from said inner peripheral wall, said barbecue grill assembly further comprising a grill member disposed above said mounting plates and surrounded by said inner peripheral wall of said main frame.

3. The barbecue grill assembly as claimed in claim 2, wherein each of said mounting plates is formed with a vertically extending fastener hole therethrough, each of said mounting seats having a top wall formed with a threaded hole that is aligned with said fastener hole in a respective one of said mounting plates, said barbecue grill assembly further comprising a plurality of threaded rods extending through said fastener holes and said threaded holes for securing said mounting seats on said mounting plates, respectively.

4. The barbecue grill assembly as claimed in claim 3, wherein each of said mounting seats has an annular rim which extends upwardly from said top wall and which cooperates with said top wall to confine a reservoir chamber, each of said mounting plates having an inner edge distal to said inner peripheral wall of said main frame and formed with a slot that is communicated with said reservoir chamber, said reservoir chamber being adapted to receive fluid that splashes onto a corresponding one of said mounting plates, said annular rim of said mounting seat being formed with a notch for draining the fluid.

5. The barbecue grill assembly as claimed in claim 4, wherein each of said mounting seats further has a support rod which extends upwardly from said top wall through said slot of the corresponding one of said mounting plates, said support rod having a horizontal section extending toward an interior of said main frame to support said grill member thereon.

6. The barbecue grill assembly as claimed in claim 1, further comprising a plurality of bushings, each of which is formed from a resilient material and is sleeved on said cylindrical coupling portion of a respective one of said mounting seats, each of said bushings having an upper edge and being formed with a radial slot which permits extension of said retaining pin therethrough and which extends downwardly from said upper edge of said bushing.

7. The barbecue grill assembly as claimed in claim 1, wherein each of said leg members further has a lower end portion opposite to said upper end portion, said barbecue grill assembly further comprising a bottom plate formed with a plurality of vertical mounting sleeves which are sleeved respectively on said lower end portions of said leg members.

8. The barbecue grill assembly as claimed in claim 7, wherein said lower end portions of a first adjacent pair of said leg members are each formed with a diametrically extending axle hole, said barbecue grill assembly further comprising a wheel axle disposed below said bottom plate and having two opposite ends extending through said axle holes in said lower end portions of the first adjacent pair of said leg members, and a pair of first wheel units mounted on said opposite ends of said wheel axle, said first wheel units being rotatable about an axis of said wheel axle.

9. The barbecue grill assembly as claimed in claim 8, wherein said lower end portions of a second adjacent pair of said leg members are tubular and have axial bottom openings, said barbecue grill assembly further comprising a pair of second wheel units mounted on said lower end portions of the second adjacent pair of said leg members and disposed below said bottom plate, each of said second wheel units including an upright mounting post extending upwardly into said lower end portion of a respective one of the second adjacent pair of said leg members via said bottom opening and fastened to the respective one of the second adjacent pair of said leg members, a pivot seat disposed below said mounting post and pivoted to said mounting post so as to be pivotable about a vertical axis, and a wheel member mounted rotatably on said pivot seat so as to be rotatable about a horizontal axis.

10. The barbecue grill assembly as claimed in claim 9, wherein said mounting post has an outer surface formed with an annular flange which abuts against a lower edge of said lower end portion of the respective one of the second adjacent pair of said leg members.

* * * * *